United States Patent [19]

Matsuura et al.

[11] Patent Number: 5,162,442
[45] Date of Patent: Nov. 10, 1992

[54] PROCESS FOR PRODUCING GRANULAR PROPYLENE POLYMERS ENDOWED WITH IMPROVED FLOWING CHARACTERISTICS

[75] Inventors: Mitsuyuki Matsuura; Takashi Fujita, both of Yokkaichi, Japan

[73] Assignee: Mitsubishi Petrochemical Company Limited, Tokyo, Japan

[21] Appl. No.: 407,283

[22] Filed: Sep. 14, 1989

[30] Foreign Application Priority Data

Sep. 22, 1988 [JP] Japan ................... 63-237914

[51] Int. Cl.$^5$ .......................................... C08F 297/08
[52] U.S. Cl. ................................. 525/247; 525/268; 525/322; 525/323; 525/324
[58] Field of Search ............... 525/247, 268, 322, 323, 525/324; 526/74

[56] References Cited

U.S. PATENT DOCUMENTS

| | | | |
|---|---|---|---|
| 3,354,239 | 11/1967 | Short | 525/323 |
| 3,530,107 | 9/1970 | Yoshioka et al. | 525/270 |
| 3,531,446 | 9/1970 | Sommer et al. | 526/74 |
| 3,974,236 | 8/1976 | Koga et al. | 525/323 |
| 4,454,299 | 6/1984 | Schweier et al. | 525/323 |
| 4,483,966 | 11/1984 | Suzuki et al. | 525/323 |
| 4,820,775 | 4/1989 | Shiga et al. | 525/270 |

FOREIGN PATENT DOCUMENTS 020946 11/1986 European Pat. Off. .

*Primary Examiner*—Joseph L. Schofer
*Assistant Examiner*—R. H. Delmendo
*Attorney, Agent, or Firm*—Oblon, Spivak, McClelland, Maier & Neustadt

[57] ABSTRACT

In a process for producing granular propylene block copolymers in two steps wherein a resinous homopolymer of propylene is produced in the first step and an elastomeric copolymer of propylene with ethylene is produced in the second step, the improvement which comprises conducting the second step in the presence of a granular propylene homopolymer added thereby to produce granular propylene copolymers endowed with an improved granulometric properties such as lowered tackiness and thus improving flowing characteristics.

13 Claims, No Drawings

PROCESS FOR PRODUCING GRANULAR PROPYLENE POLYMERS ENDOWED WITH IMPROVED FLOWING CHARACTERISTICS

BACKGROUND OF THE INVENTION

Field of the Art

The present invention relates to technology for improving granulometric property, i.e. flowing characteristic, of granular propylene copolymers which are called propylene block copolymers.

Recently, it has become popular to produce propylene block copolymers comprising a resinous segment of polypropylene and an elastomeric segment of an ethylene-propylene copolymer by gas-phase polymerization, and the use of such block copolymers has been increased in automobile industries for manufacturing, in particular, bumpers, inner panels, outer sheeting and the like.

Such block copolymers may, however, have some drawbacks such that higher the content of elastomeric block is, increased will be the stickiness of polymer particles resulting in poor flowing characteristics whereby commercial value of product will be reduced and a problem will be posed upon transportation and storage of the product polymer.

Increase in the stickiness of polymer particles will invite adherence of polymer in a polymerization vessel, especially in a case of gas phase polymerization, whereby stable polymerization operation will often be impaired.

SUMMARY OF THE INVENTION

It is an object of the present invention to solve the above problems, wherein the object is attained in accordance with the present invention by adding polymer particles of a specified class to the process of production of the elastomeric segment in the production of propylene block copolymers of the nature given above.

Accordingly, there is provided in accordance with the present invention a process for producing granular propylene copolymers comprises: a first polymerization step wherein propylene as such or in admixture with ethylene is subjected to polymerization in one or more steps in the substantial absence of an inert solvent thereby to produce a granular propylene homopolymer or copolymer with ethylene of an ethylene content of no higher than 7% by weight; and a second polymerization step wherein ethylene as such or in admixture with propylene is subjected to polymerization, in the presence of a product of the first polymerization step, in one or more steps in the substantial absence of an inert solvent thereby to produce an elastomeric polymer of ethylene, the second polymerization step being performed in the presence of an added granular propylene homopolymer of an average diameter of 30 to 150 microns in a quantity of 0.1 to 20% by weight indicated as a content in the granular propylene copolymer finally produced.

According to the present invention, stickiness of propylene block copolymers and, in turn, flowing characteristics of the polymer particles are successfully improved. As the result, process stability in polymerization and in transportation and storage of polymers are improved leading to not a few improvement in productivity.

These advantages are assumed at least to some extent to owe to the addition of granular homopolypropylene to the second polymerization step, which would be assumed to have been unexpected because the problem of stickiness of polymer has heretofore been found even when the first polymerization step is conducted for homopolymerization of propylene whereby homopolypropylene is then brought to the second polymerization step.

DETAILED DESCRIPTION OF THE PREFERRED EMBODIMENTS

Production of the propylene copolymers

The propylene copolymers to which the present invention is applied, namely what is called "propylene block copolymers" are well known in the art as to the products per se and thus their production.

Accordingly, the propylene copolymers to be used in the practice of present invention are produced by any suitable process or method known in the art.

Catalyst

The catalysts for the practice of the present invention may thus be any of those known in the art including those in which an electron donor is used as what is called "inside donor" or "outside donor", and include, for example, those which are based on titanium trichloride or based on a titanium compound such as titanium tri- and/or tetrahalide supported on a magnesium compound such as a magnesium halide, having been prepared with or without an electron donor used as an inside donor, and which are in combination with an organoaluminum compound with or without an electron donor used as an outside donor in combination therewith.

Examples of such catalysts include those disclosed in Japanese Patent Publication Nos. 3356/1978 and 54324/1981, and Japanese Patent Laid-Open Publication Nos. 17104/1983, 23806/1983, 213006/1983, 108383/1975, 16297/1976, 16298/1976, 69892/1977, 78691/1977, 10398/1978, 12796/1978, 124186/1978, 138487/1978, 79194/1979, 45688/1978, 3894/1979, 31092/1979, 39483/1979, 94591/1979, 118484/1979, 131589/1979, 75411/1980, 90510/1980, 90511/1980, 127405/1980, 147507/1980, 155003/1980, 18609/1981, 70005/1981, 72001/1981, 86905/1981, 90807/1981, 155206/1981, 3803/1982, 34103/1982, 92007/1982, 121003/1982, 5309/1983, 5310/1983, 5311/1983, 8706/1983, 27732/1983, 32604/1983, 32605/1983, 67703/1983, 117206/1983, 127708/1983, 183708/1983, 183709/1983, 149905/1984, 149906/1984, 211312/1986, 197607/1986, 204202/1986, 187707/1987, 187706/1987, 246906/1987, 39901/1988, 257906/1987, 20507/1987, 287906/1986, and 266413/1986, and U.S. Pat. Nos. 4,617,284, 4,703,026, 4,780,443, 4,814,314 and 4,822,763.

Polymerization process

The propylene copolymers for the practice of the present invention is produced by a process comprising two steps of:

a first polymerization step wherein propylene as such or in admixture with ethylene is subjected to polymerization in one or more steps in the substantial absence of an inert solvent thereby to produce a granular propylene homopolymer or copolymer with ethylene of an ethylene content of no higher than 7% by weight, preferably of no higher than 2% by weight, preferably propylene homopolymer; and a second polymerization step wherein ethylene as such or in admixture with propylene is subjected to polymerization, in the presence of a product of the first polymerization step, in one or more steps in the substantial absence of an inert solvent thereby to produce an elastomeric polymer of ethylene.

It is to be understood that the expression "in the presence of a product of the first polymerization step" means that the catalyst activity used in the first polymerization step is retained at least partly, and includes the situation such that not only all but also a part of the process product of the first polymerization step is brought to the second step polymerization step and that an organometal compound which may be regarded as a co-catalyst of a Ziegler-type catalyst or an electron donor compound as what is called "outside donor" is introduced or supplemented thereto.

The first polymerization step may be performed at a temperature such as e.g. 50° to 100° C., preferably 60° to 90° C., and under a pressure of such as e.g. 1 to 50 kg/cm$^2$G. It may be preferable in the first polymerization step to use a molecular weight controlling agent such as hydrogen gas to obtain a polymer such that its MFR is regulated so that the final propylene copolymer endowed with a higher melt flow rate, MFR, such as 1 to 300 will be obtained after the practice of the second polymerization step.

The second polymerization step may be performed so that ethylene or a mixture of propylene with ethylene is further introduced into the polymerization to polymerize it in one or more steps thereby to produce an ethylene homopolymer or a propylene-ethylene copolymer of an ethylene content of 20 to 100% by weight, preferably 30 to 90% by weight, more preferably 35 to 70% by weight, in a quantity of 5 to 70% by weight, preferably 10 to 50% by weight, of the final propylene copolymer produced.

The second polymerization step can be modified so that a comonomer other than ethylene in a smaller quantity than ethylene is used in addition to ethylene. Such comonomers are, for example, u-olefins such as 1-butene, 1-pentene, and 1-hexene.

Use of such comonomer is permissible also in the first polymerization step and the first polymerization step is to be so construed, but the advantage due to the use of such comonomers may not be prominent.

The second polymerization step may be performed at a temperature such as e.g. 50° to 100° C., preferably 60° to 90° C. under a pressure such as e.g. 1 to 50 kg/cm$^2$G.

A molecular controlling agent can be used also in the second polymerization step, but the use may sometimes be omitted.

Production of propylene copolymers in two steps in accordance with the present invention is carried out in any mode of operation for each of the steps such as batch-wise, continuous or semi-batchwise operation.

The present invention is concerned with production of granular propylene copolymers endowed with improved flowing characteristics, and may thus be carried out typically by gas-phase polymerization. The gas-phase polymerization, namely polymerization in a gaseous monomer in the absence of an inert solvent, is carried out in any mode of operation in respect of the contact of polymer particles having catalytic active sites with a gaseous monomer. Typically, gas-phase polymerization is conducted so that polymer particles are fluidized in a gas-phase to form a fluidized bed, or so that polymer particles are recycled in a gas phase comprising mainly a gaseous monomer. The polymer produced is usually in the form of particles of an average diameter of 100 to 2,000 microns, preferably 300 to 1,000 microns, and such granular polymer is preferable, too.

Addition of propylene homopolymer

The present invention is concerned with modification of or improvement to the production of propylene copolymers in two steps as shown hereinabove, and is characterized by the fact that the second polymerization step is performed in the presence of an added granular propylene homopolymer of an average diameter of 30 to 150 microns in a quantity of 0.1 to 20% by weight indicated as a content in the granular propylene copolymer finally produced.

The granular homopolypropylene for the second polymerization step may be any of those produced by any known or suitable process. The catalyst for polymerization of propylene can be any of those referred to hereinabove for production of the propylene copolymers, and the temperature such as 50° to 100° C., preferably 60° to 90° C. and a pressure of 1 to 50 kg/cm$^2$G may be mentioned. Any mode of operation including batchwise, continuous and semi-batchwise operation is also applicable for production of the homopolypropylene, and includes polymerization in an inert hydrocarbon solvent such as heptane and hexane, polymerization in a medium or dispersant which is a liquefied monomer itself, polymerization in a gaseous monomer in the absence of an inert solvent, or any combination of these.

The homopolypropylene to be added in the second polymerization step is preferably one having a melt flow rate, MFR, such as e.g. 0.1 to 100 and having a content of an atactic polymer in a quantity as small as possible so that the isotactic index, I.I., is preferably 95 or higher. The homopolypropylene should have an average particle size of 30 to 150 microns, preferably 50 to 100 microns. The "average particle size" herein used is an average particle size determined by means of particle distribution on weight basis. The MFR is determined by methods of ASTM D 1238-1973.

The second polymerization step is performed in accordance with the present application "in the presence of an added granular propylene homopolymer", which means that the specified quantity of the homopolymer is present in the second polymerization step and includes such a mode of "addition" that all the required quantity of the homopolymer is present in the second polymerization step which is a typical embodiment, namely the homopolypropylene is added before the start of the second polymerization step, and any other mode of addition such that at least a portion of the required quantity of the homopolymer is added after the start of the second polymerization step provided that such a mode of addition provides advantages inherent in the addition of the homopolymer is found. The addition of the homopolymer before the start of the second polymerization step is typically after the end of the first polymerization step and before the start of the second polymerization step, but it is possible to add the homopolymer during or preferably in the latter course of the first polymerization step. The homopolypropylene when added during the first polymerization step is an inert interposition in the first polymerization step and should thus be differentiated from a homopolypropylene in an intimate association with catalysis such as one used as a catalyst carrier in the gas-phase polymerization. The term "addition" includes the addition in lump and once and the addition in portion-wise. It is of course open to add a homopolypropylene to the product of the second polymerization step wherein a homopolypropylene has been added, namely the product of the present invention.

The quantity of homopolypropylene is 0.1 to 20% by weight, preferably 1 to 10% by weight, indicated as a content in the resultant final propylene copolymer.

EXAMPLES

EXAMPLE 1

(a) Production of a catalyst for producing a propylene copolymer

Into a flask thoroughly replaced in it with nitrogen was introduced 200 ml of dehydrated and deoxygenated n-heptane, and subsequently 0.4 mol of $MgCl_2$ and 0.8 mol of $Ti(O-nC_4H_9)_4$ and the reaction was carried at 95° C. for 2 hours. After completion of the reaction, the temperature was lowered to 40° C., followed by addition of 48 ml of methylhydropolysiloxane (of 20 centistokes) and the reaction was carried out for 3 hours. The solid component formed was washed with n-heptane.

Subsequently into a flask thoroughly replaced in it with nitrogen was introduced 50 ml of n-heptane purified similarly as described above, and the solid component prepared above was introduced in an amount of 0.24 mol as calculated on Mg atom. Then, a mixture of 25 ml of n-heptane with 0.4 mol of $SiCl_4$ was introduced into the flask at 30° C. over 30 minutes, and the reaction was carried out at 70° C. for 3 hours. After completion of the reaction, the product was washed with n-heptane. A mixture of 25 ml of n-heptane with 0.024 mole of phthalic chloride was introduced to the flask at 70° C. over 30 minutes, and reacted at 90° C. for 1 hour.

After the reaction, the product was washed with n-heptane, followed by addition of 20 ml of $SiCl_4$, and the reaction was conducted at 80° C. for 6 hours. After the reaction the product was washed amply with n-heptane. The product was found to have a Ti-content of 1.21% by weight.

Into a flask amply replaced in it with nitrogen was introduced 50 ml of amply purified n-heptane, and then 5 g of the solid component obtained above was introduced. Next, 1.6 ml of $(CH_3)_3CSi(CH_3)(OCH_3)_2$, 1.2 ml of $SiCl_4$, and further 3.0 g of triethylaluminum were respectively introduced and contacted at 30° C. for 2 hours. After completion of the contact, the product was amply washed with n-heptane to provide a component (A).

(b) Production of a propylene homopolymer

A catalyst was prepared by the process set forth in Example 1 of Japanese Patent Laid-Open Publication No. 211312/1986 and propylene was polymerized over the catalyst in accordance with the process described also therein. From the polymer produced, a polymer of an average particle size of 85 microns was obtained.

(c) Production of a propylene copolymer/addition of a propylene homopolymer

According to the process disclosed in Japanese Patent Publication No. 33721/1986, copolymerization of propylene was carried out wherein a horizontal biaxial gas phase polymerization vessel of 13-liter volume was used.

After replacement of the polymerization vessel in it with thoroughly purified nitrogen, 400 g of an amply dehydrated and deoxygenated polymer carrier was added. Subsequently, 500 mg of triethylaluminum of the component (B) and 100 mg of the above prepared component (A) were introduced. The first polymerization step was conducted so that after introduction of 1000 ml of hydrogen, at a temperature controlled to 75° C., propylene was introduced at a constant rate of 1.3 g/min. The stirring rotation of the polymerization vessel was 350 r.p.m. The polymerization temperature was maintained at 75° C. and, after 3 hours and 10 minutes, introduction of propylene was stopped. Polymerization was continued at 75° C., and when the polymerization pressure became 1 $kg/cm^2G$, a small amount of the polymer was sampled.

Then, 18 g of the homopolypropylene of (b) and 500 ml of $H_2$ was added to initiate the second polymerization step. The second stage polymerization was carried out by introducing 0.59 g/min. of propylene and 0.40 g/min. of ethylene respectively at constant rates at 70° C. for 2 hour and 15 minutes. Introduction of propylene and ethylene was stopped, and polymerization under the residual pressure was carried out until the polymerization pressure became 1 $kg/cm^2G$. After completion of polymerization, the polymer was taken out after purging the process product to give 392 g of a polymer. The polymer formed had an MFR of 7.8 g/10 min., a polymer bulk density (B.D.) of 0.40 g/cc, and a polymer falling speed of 5.8 sec. The weight of the elastomeric copolymer was 33.6% by weight.

There was no polymer adherence in the polymerization vessel at all, and the intermediate sample had an MFR or 18.3 g/10 min. The quantity of a homopolypropylene added was 4.6% by weight.

The "polymer falling speed" means the time required for falling of 50 g of the polymer out of an outlet of 2.5 $cm^2$ of a vessel. The weight of the elastomeric copolymer is a weight of a xylene soluble matter at 20° C.

EXAMPLE 2

The procedure set forth in Example 1 was followed except for the average particle size and the quantity of the propylene homopolymer added changed to 110 microns and 8.5%, respectively.

The polymer B.D. was 0.41 g/cc and the polymer falling speed was 5.6 seconds.

EXAMPLE 3

The procedure set forth in Example 1 was followed except for the average particle size and the quantity of the propylene homopolymer added changed to 63 microns and 1.2% by weight, respectively.

The polymer B.D. was 0.39 g/cc and the polymer falling speed was 6.1 seconds.

REFERENCE EXAMPLE 1

The procedure set forth in Example 1 was followed except for no use of the propylene homopolymer. A polymer in a quantity of 381 g was obtained. The polymer B.D. was 0.26 g/cc, the polymer falling speed was not measurable (no falling), and there was a lot of adherence of the polymer in the polymerization vessel.

We claim:
1. A process for producing granular propylene copolymers which comprises:
   a first polymerization stage wherein propylene as such or in admixture with ethylene is subjected to gas phase polymerization, in one or more steps, and in the presence of a catalyst comprising (1) titanium trichloride or a titanium compound supported on a magnesium compound and (2) an organoaluminum compound, to produce a granular propylene homopolymer or copolymer with ethylene of an ethylene content of no higher than 7% by weight as a reaction product of said first polymerization stage; and a second polymerization stage wherein ethylene as such or in admixture with propylene is subjected to gas phase polymerization to produce an elastomeric polymer of ethylene, in the presence of at least a portion of said reaction product of said first polymerization stage, in one or more steps, and in the presence of an added granular propylene homopolymer, added after completion of said first stage, having an average diameter of 30 to 150 microns in a quantity of 0.1 to 20% by weight indicated as a content in the granular propylene copolymer finally produced.

2. The process as claimed in claim 1 wherein said reaction product of said first polymerization stage is a homopolymer of propylene.

3. The process as claimed in claim 1 wherein said reaction product of said first polymerization stage is a propylene copolymer with ethylene of an ethylene content of no higher than 2% by weight.

4. The process as claimed in claim 1 wherein said elastomeric polymer produced in said second polymerization stage is an ethylene homopolymer.

5. The process as claimed in claim 1 wherein said elastomeric polymer produced in said second polymerization stage is an ethylene copolymer with propylene of an ethylene content of 20 to 100% by weight.

6. The process as claimed in claim 5 wherein said elastomeric polymer produced in said second polymerization stage is an ethylene copolymer with propylene of an ethylene content of from 30 to 90% by weight.

7. The process as claimed in claim 1 wherein said elastomeric polymer produced in said second polymerization stage is an ethylene copolymer with propylene of an ethylene content of 35 to 70% by weight.

8. The process as claimed in claim 1 wherein said elastomeric polymer produced in said second polymerization stage comprises 5 to 70% by weight of said granular propylene copolymer finally produced.

9. The process as claimed in claim 1 wherein said elastomeric polymer produced in said second polymerization stage comprises 10 to 50% by weight of said granular propylene copolymer finally produced.

10. The process as claimed in claim 1 wherein said added granular propylene homopolymer has an MFR of 1 to 100 and an I.I. of at least 95.

11. The process as claimed in claim 1 wherein said added granular propylene homopolymer has an average particle size of 50 to 100 microns.

12. The process as claimed in claim 1 wherein said added granular propylene homopolymer is added so that all the required quantity thereof is present before the start of the second polymerization step.

13. A process for producing granular propylene copolymers which comprises:

a first stage of polymerizing propylene as such or in admixture with ethylene, in one or more steps, in the gas phase, and in the presence of a catalyst comprising (1) titanium trichloride or a titanium compound supported on a magnesium compound and (2) an organoaluminum compound, thereby producing a granular propylene homopolymer or copolymer with ethylene having an ethylene content of no greater than 7% by weight; and a second polymerization stage comprising adding granular propylene homopolymer, after completion of said first stage, having an average diameter of 30 to 150 microns to said granular propylene homopolymer or copolymer product of said first polymerization stage to form a combined material and polymerizing ethylene as such or in admixture with propylene in the presence of said combined material, in one or more steps, in the gas phase thereby producing a granular propylene copolymer, wherein the granular propylene homopolymer which is added after completion of said first polymerization stage is added in a quantity of 0.1 to 20% by weight indicated as a content in the granular propylene copolymer finally produced.

* * * * *